June 9, 1953 M. ARTZT 2,641,645
PHASE SHIFTING OR DELAY NETWORK
Filed Nov. 16, 1949 3 Sheets-Sheet 1
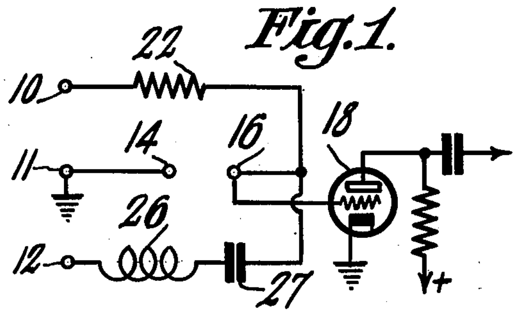
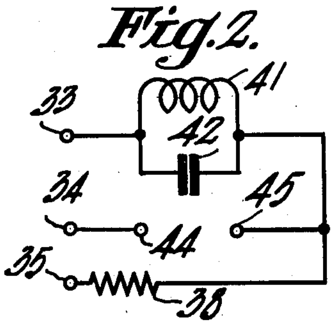
Fig. 3.
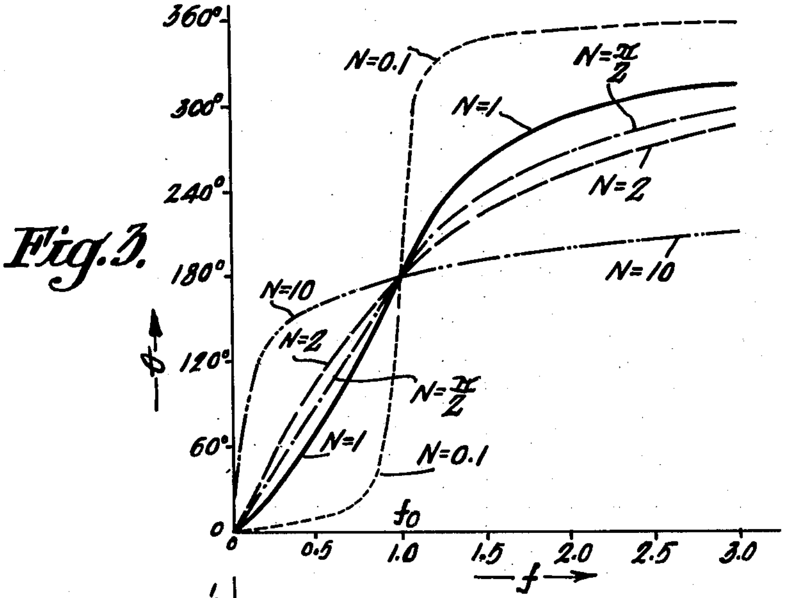
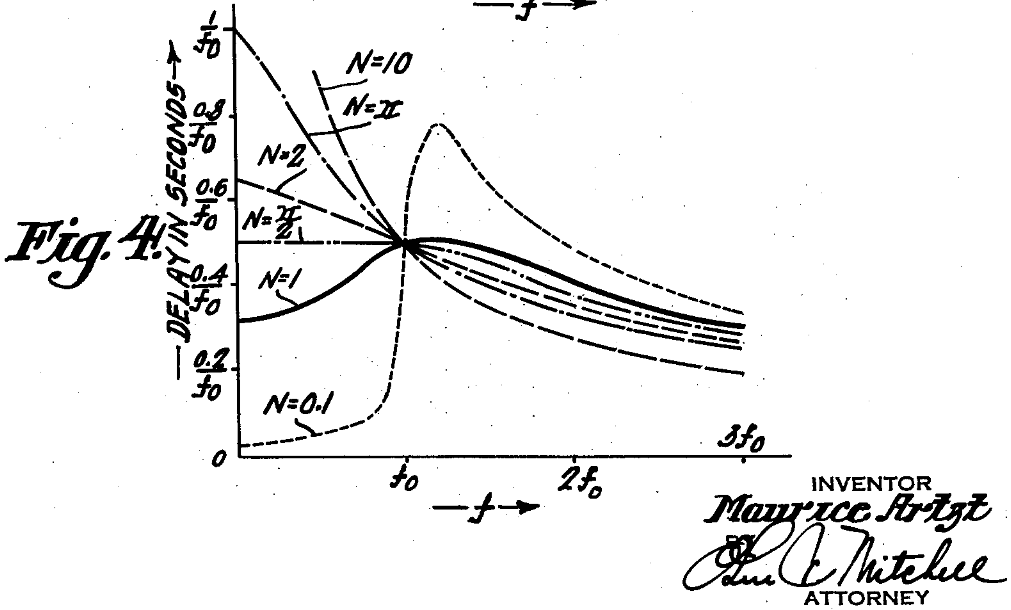
INVENTOR
Maurice Artzt
BY
[signature]
ATTORNEY INVENTOR
Maurice Artzt
BY [signature]
ATTORNEY June 9, 1953 M. ARTZT 2,641,645

PHASE SHIFTING OR DELAY NETWORK

Filed Nov. 16, 1949 3 Sheets-Sheet 3

INVENTOR
Maurice Artzt
BY
[signature]
ATTORNEY

Patented June 9, 1953 2,641,645

UNITED STATES PATENT OFFICE 2,641,645

PHASE SHIFTING OR DELAY NETWORK

Maurice Artzt, Princeton, N. J., assignor to Radio Corporation of America, a corporation of Delaware Application November 16, 1949, Serial No. 127,742

7 Claims. (Cl. 178—44)

The present invention relates to phase shifting or delay networks and more particularly, but not necessarily exclusively, to novel and simplified phase shifting or delay networks which, preferably, are terminated by an infinite impedance.

In accordance with the invention, phase shifting or delay networks are provided in which variable delay may be obtained in a simple manner by changing the value of a single component, such, for example, as a resistor, in the network. In delay networks heretofore known, it is impossible to change the shape of the phase delay curve without changing all of the reactive elements of the network if the terminating resistor remained constant. In phase delay or phase shifting networks heretofore known, if the value of the terminating resistor is allowed to change one-half of the impedance elements of the network must be changed in order to obtain the change in phase delay. Even this procedure is prohibitive to obtain changes in phase delay.

Phase delay networks, previously known, were usually of the balanced lattice type having two similar reactances in series with the line, and two other reactances criss-crossed across the line. In the design of such a network all impedances are referred to the value of the surge of terminating resistance. It can be shown that as the series arms and the cross-connected arms of the network are made progressively more complicated by using various series and parallel arrangements of coils and condensers, the phase curve can be made any shape desired to accomplish some single desired delay correction. But once this curve shape is determined, it cannot be altered even slightly to meet changing conditions without changing all of the reactive elements, as stated above, as the terminating resistor is held fixed, or changing half of the elements if the terminating resistor is allowed to change. It is thus practically impossible to obtain a variable delay equalizer in which the curve can be altered to fit changing conditions by using a lattice type network for delay correction.

In accordance with the invention, a delay network is provided which has a substantially infinite output impedance. In this connection the infinite output impedance for all practical purposes may be constituted by the grid cathode circuit of a space discharge tube.

The principal object of the present invention is to provide a novel phase shifting or delay network which may be controlled in a simple manner to provide a variable delay curve. In accomplishing this, the delay curve of each section of a multiple section phase shifting network can be varied over wide limits by a variable resistor, a method of control which was unavailable and impossible with known networks such as the loaded or terminated symmetrical lattice network.

Another object of the invention is to provide a novel phase shifting or delay network having a balanced input and an unbalanced output in which one arm is a simple resistance and another arm is an impedance comprising inductance and capacity in desired relationships depending upon the general nature of the phase shift or delay characteristics desired.

Other objects and advantages of the invention will, of course, become apparent and immediately suggest themselves to those skilled in the art to which the invention is directed from a reading of the following specification in connection with the accompanying drawings in which:

Fig. 1 shows schematically, a phase delay network embodying principles of this invention, this embodiment giving an increase of phase angle with frequency;

Fig. 2 of the drawings shows schematically another phase delay network embodying the invention which in certain respects is of an inverse type;

Fig. 3 of the drawings shows curves serving to illustrate the change of phase angle with frequency for the network of Fig. 1;

Fig. 4 of the drawings shows curves illustrating the delay characteristics of the network of Fig. 1;

Figure 5:
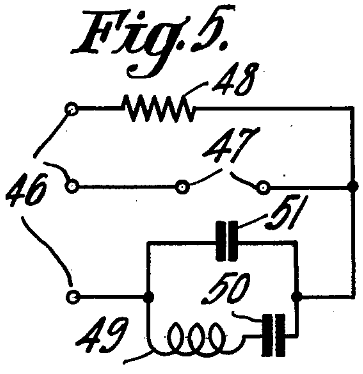
Figs. 5 and 6 show schematically other phase delay networks in accordance with the invention which are complementary to each other.

Figs. 1 and 2 of the drawings show, diagrammatically, two delay correction or phase shifting networks embodying the invention. These networks are shown illustratively in such a way that their elements and the position of the elements in each circuit corresponds somewhat to the elements of one-half of a lattice type of delay network. The comparison of circuits of the present invention with a lattice type of delay network is drawn solely for the purpose of indicating the relative simplicity of circuits involving the present invention as compared with the complications of a lattice type of delay network. As pointed out above, it is difficult, if not impossible to change the phase angle and delay characteristics of the known lattice type of network. In contrast with this, a simple change of a resistor or the adjustment of a variable resistor will result in a change in characteristics over a useful range in networks involving this invention.

In the illustrative embodiments given herein by way of example, coils and condensers have shown for the sake of convenience of illustration and description, however, it is to be pointed out that tunable or tuned transmission lines and resonant cavities may be used. Tunable mechanically resonant elements, electrically driven, such as tuning forks, magnetostrictive devices or crystals may be used also.

In Fig. 1, balanced input terminals are designated by reference characters 10, 11 and 12. In this way a balanced center tapped input voltage may feed the network. By way of example, this input voltage may be obtained from a center tapped inductor or a center tapped transformer secondary. Phase inverter arrangements may also be employed to apply the balanced input voltage to the terminals 10, 11 and 12. The single ended output appears across terminals 14 and 16 of the network. An important feature of the present invention, as pointed out above, is that a terminating impedance is unnecessary. With infinite output impedance, the simplest and most versatile arrangement is reached in accordance with the invention. With the network feeding a tube grid, as shown illustratively in Fig. 1, infinite impedance for purposes of the invention is obtained. The control grid 18 of the tube is connected to the terminal 16 while the cathode of the tube is shown as being connected to a voltage reference point such, for example, as ground to which the terminal 11 is connected.

Not only is the network of Fig. 1 unloaded or connected to an infinite output impedance, but one of its arms is a simple resistance as indicated at 22. The other arm is reactive and is shown illustratively as including an inductance 26 and the condenser 27 connected in series with respect to the terminals 12 and 16. Either an inductance or a condenser alone may be inserted between the terminals 12 and 16. If this is done, it is to be noted that a network is obtained having only one reactance, for example, inductive reactance or capacity reactance. Where the reactive arm for example the arm between the terminals 12 and 16 is a simple capacitor the phase delay $\phi$ in terms of the frequency $f$ is given by $$\phi=2\tan^{-1}(-f)$$

Where the reactive arm consists of inductance only the phase delay is also $$\phi=2\tan^{-1}(-f)$$

In the first case $f=f_0=1$ where $x_c=R_0$. That is, $f$ is the frequency in terms of the frequency $f_0$ at which $x_c=R_0$. In the second case $f=f_0=1$ where $X_L=R_0$ and $f$ is the frequency in terms of the frequency $f_0$ at which $X_L=R_0$.

For the illustrative example of Fig. 1, the phase delay is given by $$\phi=-2\tan^{-1}\left[\frac{fN}{1-f^2}\right]$$

where N is the ratio of R, the value of resistance 22 to $R_0$.

This expression is plotted in Fig. 3 for different values of the resistor 22 as expressed by the ratio N, with $f$ as the independent variable. For example, at the resonant frequency of Fig. 6 marked $f_0$ the frequency is considered to have a value of unity. The resistance 22 for $N=1$ is considered to be equal to the inductive reactance of the inductance 26 and also equal to the capacity reactance of the condenser 27. The factor N thus converts all of the data to a practical value suited to a particular problem or use.

Referring to Fig. 4 the delay in seconds is plotted against frequency. Here again, a factor N is introduced which is a multiplier for the value of the resistor 22 which may be considered as $R_0$ when it is equal to the inductive reactance of the inductance or the capacitive reactance of the condenser 27. The delay in seconds at any point on any of the phase curves for this or other networks embodying the present invention is $$D=\frac{\phi}{360°}\cdot\frac{1}{f}$$

where $f$ is the actual frequency at this point in cycles per second. For the particular network in Figure 1 the delay in seconds for D. C. or zero frequency is given by the expression $$D_0=\frac{N}{\pi f_0}$$

seconds.

Fig. 4 illustrates the various shapes of delay curves which may be obtained by varying only the resistance arm 22 with no other change needed to maintain substantially constant amplitude of output. All curves have a delay of $$\frac{0.5}{f_0}\text{ at }f_0$$

which is the resonant frequency. When N is set at the value of $$\frac{\pi}{2}$$

the delay at zero frequency is made equal to the delay at $f_0$ and the delay for all values of $f$ between 0 and $f_0$ is very flat. The type of network shown illustratively at Fig. 1 is therefore available for use in place of a transmission line for delaying a signal or signals in a wide frequency band.

In Fig. 2 the balanced input terminals are designated 33, 34 and 35. The resistance arm is indicated by reference character 38. The reactance in Fig. 2 is made up of a parallel combination of an inductance 41 and a condenser 42. The single ended output is available across the terminals 44 and 45. The phase angle is given by the expression $$\phi=-2\tan^{-1}\left[\frac{f}{N(1-f^2)}\right]$$

Delay is given by $$D_0=\frac{1}{\pi N f_0}$$

seconds. It is to be noted that changing the value of N has the opposite effect in Fig. 2 from that of the circuit of Fig. 1.

The same curves as are shown in Figs. 3 and 4 can be obtained from the network of Fig. 2 by using the reciprocals of the N values given on the curves of Fig. 4.

Figure 6:
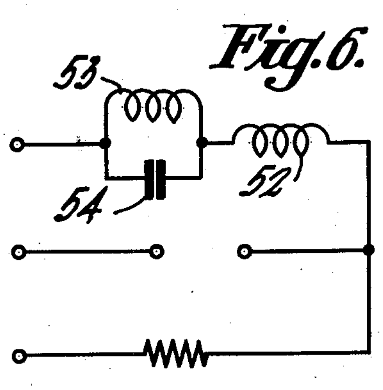

Figs. 5 and 6, show illustratively, samples of networks with three reactances in accordance with the invention. The networks of Figs. 5 and 6 are complementary in that they give the same angle for reciprocal values of N. In connection with these networks the phase angle is 180° at $f=1$, 360° at $f=\sqrt{1+M}$ and then increases to 540° at $f$=infinity where M is the ratio of the reactance of bridging capacitor 51 to that of capacitor 50 in the circuit of Fig. 5, or M for the circuit of Fig. 6 is the ratio of the reactance of inductor 53 to that of inductor 52.

In Fig. 5 the input terminals are designated 46 and the output terminals 47. There is a resistance arm 48 and the reactive arm includes a series circuit combination comprising an inductance 49 in series with a condenser 50. This series combination is connected in parallel with the condenser 51. Fig. 6 is similar to Fig. 5 with respect to the terminal connections but it includes an inductance 52 which is in series with the parallel combination of the second inductance 53 and a condenser 54.

Figure 7:
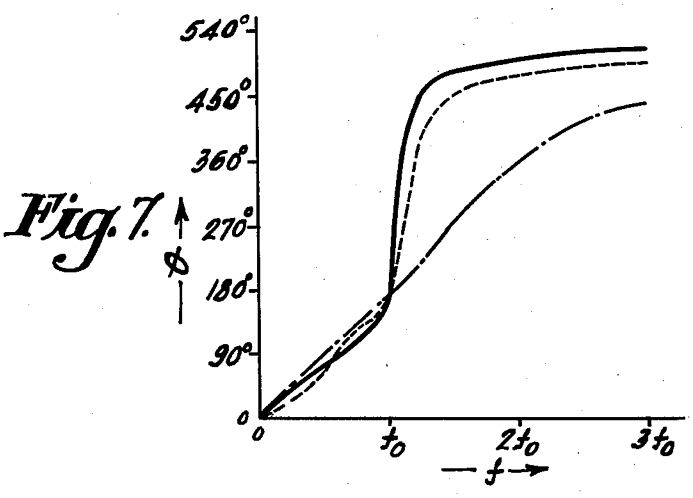
Figs. 7 and 8 are similar to 3 and 4 and show phase-frequency and delay characteristics respectively of the network of Fig. 5.
Figure 8:
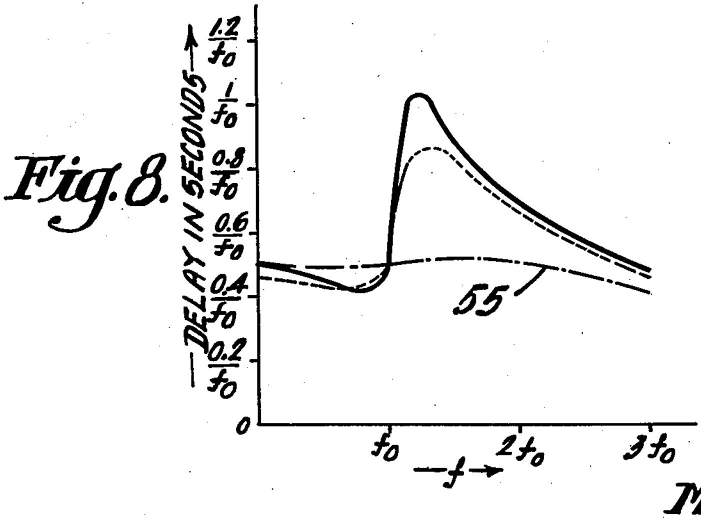

Having these two parameters, designated N and M in the description to follow, a greater variety of delay characteristics can be obtained than with the two element types of the invention exemplified in Figs. 1 and 2. Three phase angle curves for the network of Fig. 5 are shown in Fig. 7 and their equivalent time delay curves are shown in Fig. 8. Under special conditions of $M=3$ and $N=1.178$ the curve designated 55 is obtained having a delay flat to within 5 percent from $f=0$ to F=2, so that the addition of one capacitor has the effect of doubling the delay of the two element networks, exemplified in Figs. 1 and 2, for the same band width, or doubled the bandwidth for the same delay, whichever way it is used.

The expression for phase angle for the network of Fig. 5 is given by $$\phi=-2\tan^{-1}\left[\frac{NF(1+M-f^2)}{M(1-f^2)}\right]$$

The expression for the phase angle for the network of Fig. 6 is given by $$\phi=-2\tan^{-1}\left[\frac{f(1+M-f^2)}{NM(1-f^2)}\right]$$

The expression for the delay at zero frequency or D. C. for the network of Fig. 5 is given by $$D_0=\frac{N(1+M)}{\pi M f_0}$$

seconds. The expression for delay under the same conditions for the network for Fig. 6 is given by $$D_0=\frac{1+M}{\pi M N f_0}$$

Figure 9:
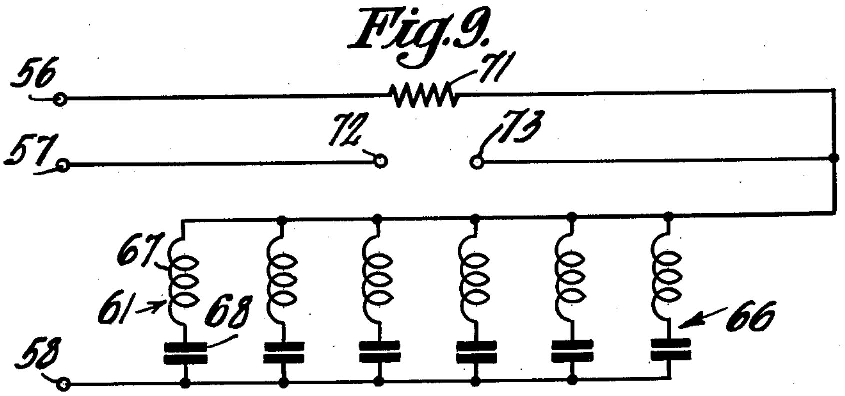
Figs. 9 and 10 show, schematically, multiresonant networks embodying principles of this invention.
Figures 10, 11:
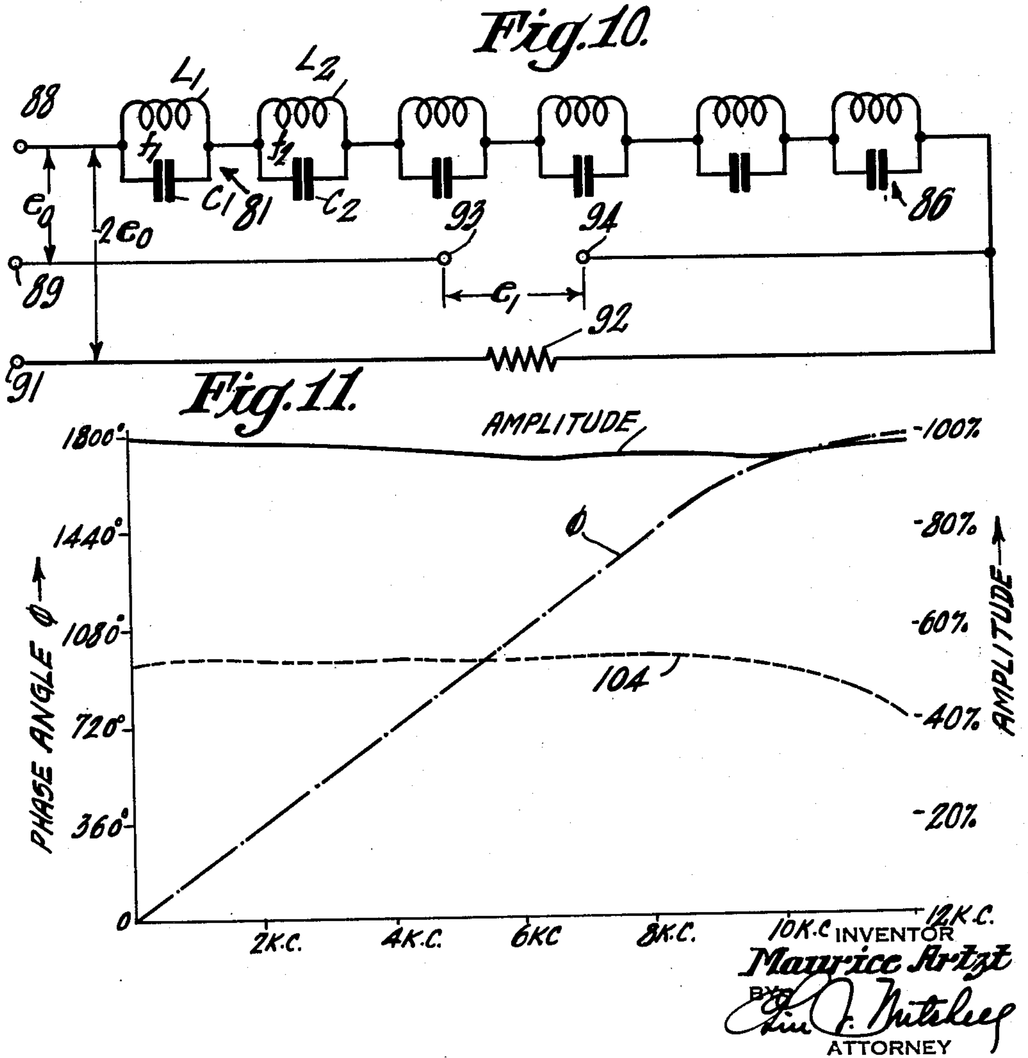
Fig. 11 shows the substantially constant delay characteristics of the network of Fig. 9.

Figs. 9 and 10 of the drawing show examples of multi-resonant delay networks in accordance with the invention. It may be pointed out that special delay curves such as are exemplified in Figs. 4 and 8 could be fitted together to obtain some particular curve for correcting a transmission line such as a telephone line or for other uses. This can be accomplished by connecting various networks involving the invention effectively in series with a phase inverter tube connected between successive networks so that their delays are added.

The equivalent and additional effects can be obtained, in accordance with the invention, in many cases by lumping a relatively large number of resonant circuits together in the same network as shown illustratively by Figs. 9 and 10. Either of the circuits of Figs. 9 and 10 can be made to give the phase excursions, but the action of both of these illustrative examples may be more readily explained by referring to Fig. 10 as will be done hereinafter.

In Fig. 9 the input terminals are designated 56, 57 and 58. A plurality of resonant circuits are shown and designated 61 to 66. Each resonant circuit comprises an inductance 67 and a condenser 68. The resonant circuits are similar. The resistance arm is designated 71 and the output from the delay network is to be taken from the terminals 72 and 73.

As stated in the foregoing, the action of multiresonant delay networks of this invention is simpler to explain by referring to Fig. 10 which is shown as including a series of resonant circuits designated 81 to 86. These resonant networks are resonant at progressively increasing frequencies which may be designated $f_1$ to $f_n$. By way of example the circuit 81 is resonant to frequency $f_1$ and the circuit 86, which is $f_n$ in this case, is the frequency $f_6$. The balanced input is to be applied across terminals 88, 89 and 91. The resistive arm is designated 92 and the unbalanced output is taken across terminals 93 and 94.

Referring now to Fig. 10 for a description of its operation, at D. C. or zero frequency the sum of all the impedances 81 to 86 in the top arm will theoretically be zero, considering the reactances are all perfect. The voltage $2e_0$ appearing across the terminals 88 and 91 will be loaded with the resistor 92 which will be designated in the following discussion as NR. The voltage $e_1$ appearing across the output terminals 93 and 94 will be in phase with the voltage $e_0$. As the frequency of $e_0$ increases up to $f_1$, the first tuning frequency of the network, the phase of $e_1$ is retarded, and at $f_1$ the upper arm has very high or theoretically infinitive impedance. The output voltage is then at 180° phase lag with respect to $e_0$. Progressing towards $f_2$ in frequency, some point will be found where series resonance of the network occurs and the impedance falls substantially zero. At this point $e_1$ will be at 360° phase lag. At resonance of $L_2$, $C_2$ at frequency $f_2$ the impedance again becomes infinity and $e_1$ lags by 540°. This continues as frequency increases through the various resonance points of $f_3$, $f_4$, $f_5$ etc. to $f_n$, which in the illustrative example is $f_6$, adding at each of these frequencies a phase lag of 360° over that obtained at the previous point. Thus, the phase angles at these tuning points will be odd multiples of 180°, in the illustrative example, being 180°, 540°, 900°, 1260° etc. The even multiple of 180°, being 360°, 720°, 1080°, etc. will come at the series resonance points between $f_1$ and $f_2$, $f_2$ and $f_3$, $f_3$ and $f_4$, etc.

It can be shown that the phase angle of lag of the network of Fig. 10 will be of the form:

$$\phi=-2\tan^{-1}\frac{f}{N}\left[\frac{a}{f_1^2-f^2}+\frac{b}{f_2^2-f^2}+\frac{c}{f_3^2-f^2}+\cdots\frac{n}{f_n^2-f^2}\right]$$

The constant *a*, *b*, *c*, etc., are determined by the proportioning of the inductance and capacity in the circuits 81, etc. The term in the bracket will be infinity at the values of frequency $f$ of $f_1$, $f_2$, $f_3$ etc. and will pass through zero somewhere between each of these two frequencies. The odd multiples of 180° are thus determined directly by the tuning points $f_1$, $f_2$, $f_3$, etc. and can be set immediately to obtain some given delay curve. A set of simultaneous equations may be set up using $f$ values at which the expression should be zero for the even multiples of 180° to be properly placed on the desired delay curve, and then solved for the values of $a$, $b$, $c$, etc. The curve is finally matched at $f=0$ for the low frequency delay, below $f_1$, by properly choosing the value of N.

What is claimed is:

1. A delay network comprising balanced input terminals, one of which also serves as an output terminal, a further separate output terminal, a resistive arm connected between one of said balanced input terminals and said separate output terminal, and a reactive arm connected between said other input terminal and said separate output terminal and comprising at least three reactance elements, two of said elements being one of the two types of inductive and capacitive and the other element being of the other type, said elements being connected in series and parallel relationship to provide at least one parallel and one series resonance.

2. The network claimed in claim 1, two of said elements being capacitive and one being inductive, said inductive and one of said capacitive elements being connected in series, the other capacitive element being connected in parallel across said series connected inductive and capacitive elements.

3. The network claimed in claim 1, two of said elements being inductive and one being capacitive, said capacitive and one inductive element being connected in parallel and the other said inductive element being connected in series with said parallel connected inductive and capacitive elements.

4. A delay network comprising balanced input terminals, one of which also serves as an output terminal, a further separate output terminal, a resistive arm connected between one of said balanced input terminals and said separate output terminal, and a reactive arm connected between said other input terminal and said separate output terminal and comprising at least two pairs of reactive elements, each pair having one inductive and one capacitive element and a different resonance frequency, said elements being connected in pairs in series and parallel relationship.

5. The network claimed in claim 4, each said pair of elements being connected in parallel and the parallel connected pairs being connected in series.

6. The network claimed in claim 4, each said pair of elements being connected in series and the series connected pairs being connected in parallel.

7. The network claimed in claim 1, said resistive arm variable.

MAURICE ARTZT.

References Cited in the file of this patent

UNITED STATES PATENTS

| Number | Name | Date |
|---|---|---|
| 2,220,118 | Overbeck | Nov. 5, 1940 |
| 2,228,844 | Palmer | Jan. 14, 1941 |
| 2,411,423 | Guptill | Nov. 19, 1946 |
| 2,503,739 | Janssen | Apr. 11, 1950 |